(12) United States Patent
Hansen et al.

(10) Patent No.: US 8,984,983 B2
(45) Date of Patent: Mar. 24, 2015

(54) STEERING COLUMN ASSEMBLY FOR A MOTOR VEHICLE

(75) Inventors: Detlef Hansen, Schenefeld (DE); Horst Hartmann, Witzhave (DE); Jens-Werner Kirchner, Buchholz Holm Seppensen (DE); Holger Kittler, Hamburg (DE); Ivica Milicevic, Hamburg (DE); Ralf Prigge, Bardowick (DE)

(73) Assignee: Daimler AG, Stuttgart (DE)

( * ) Notice: Subject to any disclaimer, the term of this patent is extended or adjusted under 35 U.S.C. 154(b) by 365 days.

(21) Appl. No.: 13/510,858

(22) PCT Filed: Oct. 19, 2010

(86) PCT No.: PCT/EP2010/006385
§ 371 (c)(1),
(2), (4) Date: Jul. 3, 2012

(87) PCT Pub. No.: WO2011/060865
PCT Pub. Date: May 26, 2011

(65) Prior Publication Data
US 2012/0266714 A1    Oct. 25, 2012

(30) Foreign Application Priority Data

Nov. 21, 2009   (DE) .................. 10 2009 054 245

(51) Int. Cl.
*B62D 1/16*   (2006.01)
*B62D 1/184*  (2006.01)

(52) U.S. Cl.
CPC ...................... *B62D 1/184* (2013.01)
USPC ........................... 74/493; 280/775

(58) Field of Classification Search
USPC .............................. 74/492, 493; 280/775, 777
See application file for complete search history.

(56) References Cited

U.S. PATENT DOCUMENTS

| | | | |
|---|---|---|---|
| 5,029,489 A * | 7/1991 | Burmeister et al. | 74/493 |
| 6,092,957 A | 7/2000 | Fevre et al. | |
| 6,581,965 B2 * | 6/2003 | Lutz | 280/775 |
| 7,052,043 B2 * | 5/2006 | Lee | 280/775 |
| 7,726,691 B2 * | 6/2010 | Yamada | 280/775 |
| 7,752,940 B2 * | 7/2010 | Lutz | 74/493 |
| 7,849,763 B2 * | 12/2010 | Lutz | 74/493 |

(Continued)

FOREIGN PATENT DOCUMENTS

| | | |
|---|---|---|
| CN | 1942358 A | 4/2007 |
| DE | 10 2006 034 714 A1 | 1/2008 |

(Continued)

OTHER PUBLICATIONS

Chinese Office Action dated Dec. 24, 2013 with partial English translation (eight (8) pages).
International Search Report with English translation dated Dec. 29, 2010, along with Form PCT/ISA/220 (six (6) pages).
Form PCT/ISA/237 (six (6) pages).

*Primary Examiner* — David M Fenstermacher
(74) *Attorney, Agent, or Firm* — Crowell & Moring LLP

(57) ABSTRACT

A steering column arrangement for a motor vehicle includes a bracket, to which a jacket tube of a steering column supporting a steering shaft is releasably fixed by a clamping mechanism. The clamping mechanism includes at least one clamping part that is supple in the transverse direction (y direction) of the steering column arrangement and rigid in shear terms in the longitudinal direction (x direction and z direction) of the steering column arrangement.

16 Claims, 3 Drawing Sheets

(56) References Cited

U.S. PATENT DOCUMENTS

| | | |
|---|---|---|
| 8,006,587 B2 * | 8/2011 | Schnitzer et al. ............... 74/493 |
| 8,226,121 B2 | 7/2012 | Bastein et al. |
| 8,359,945 B2 * | 1/2013 | Tanke et al. ..................... 74/493 |
| 2011/0006510 A1 | 1/2011 | Bastein et al. |

FOREIGN PATENT DOCUMENTS

| | | |
|---|---|---|
| DE | 10 2007 053 672 A1 | 5/2009 |
| EP | 0 900 943 A1 | 3/1999 |
| EP | 1 125 821 A1 | 8/2001 |
| WO | WO 2009/059655 A1 | 5/2009 |

* cited by examiner

STEERING COLUMN ASSEMBLY FOR A MOTOR VEHICLE

BACKGROUND AND SUMMARY OF THE INVENTION

The invention relates to a steering column arrangement for a motor vehicle, in particular a motor car.

German Patent document DE 10 2007 053 672 A1 discloses a steering column arrangement in which a jacket tube of a steering column supporting a steering shaft is releasably fixed to a bodywork-side bracket by means of a clamping means. The clamping means thereby comprises the respective bracket-side or jacket-tube-side clamping wedges that apply a corresponding clamping force for fixing the jacket tube or the steering column in a certain position relative to the bracket.

In such mechanically adjustable steering columns the clamping system or the clamping means must transfer the clamping forces to the bracket fixed to the vehicle. For high rigidity and characteristic frequency of the steering column the parts of the bracket holding the jacket tube—usually the bracket limbs—must be designed as rigidly as possible. The clamping limbs on the other hand must be designed to be as supple as possible for good transmission of the clamping force. This clearly leads to a conflict of goals.

Exemplary embodiments of the present invention provide a steering column arrangement that includes a high rigidity or characteristic frequency of the steering column and transfer of a high clamping force.

In order to provide a steering column arrangement, by means of which a high rigidity or characteristic frequency of the steering column can be realized and while also providing for the transfer of a high clamping force, the clamping means comprises according to the invention at least one clamping part that is formed to be supple in the transverse direction of the steering column arrangement. The supple clamping part thereby transfers the clamping force of the clamping means, whereby a particularly favorable degree of efficiency of the clamping force transfer can be achieved.

In an advantageous embodiment of the invention the at least one clamping part is thereby formed to be rigid in shear terms in the longitudinal direction of the steering column arrangement and arranged thereon. Through this arrangement with shear rigidity in particular the high rigidity and characteristic frequency of the steering column are achieved.

It has thereby proved advantageous in a further embodiment of the invention if the bracket comprises a limb arrangement with limb parts, between which clamping wedges of the clamping arrangement are received. The clamping wedges and also the clamping part itself can thus be connected simply in terms of shear rigidity in the longitudinal direction of the steering column arrangement in order to guarantee all in all a high rigidity and characteristic frequency of the steering column. Additionally, the limb arrangement provides a simple way to guarantee a correspondingly supple arrangement of the clamping wedges in the transverse direction of the steering column in order to hereby facilitate a high clamping force transfer.

The at least one clamping part is thereby fixed in a further embodiment of the invention either by means of clamping or in another way to the limb arrangement. This results in a particularly simple assembly and favorable fixing of the clamping part on the limb arrangement.

In a further advantageous embodiment, the at least one clamping part is arranged between the clamping wedges of the clamping arrangement. The supple arrangement of the clamping part on the clamping means is thus provided in a particularly favorable way.

Finally, it has proved advantageous if the at least one clamping part comprises for the purpose of supple formation at least one and in particular two loop regions. The clamping part can thus be easily designed to be supple in the transverse direction of the steering column arrangement.

BRIEF DESCRIPTION OF THE DRAWING FIGURES

Further advantages, features and details of the invention follow from the description below of a preferred embodiment and by reference to the drawings, in which:

FIG. 1 shows a cut-out perspective view of the steering column arrangement for a motor car with a bracket, to which a jacket tube of a steering column supporting a steering shaft is releasably fixed by means of a clamping means, wherein the clamping means comprises two clamping wedges, between which a clamping part is arranged which is formed to be supple in the transverse direction of the steering column arrangement and which is fixed to a limb arrangement of the bracket comprising two limbs;

Figure 4:
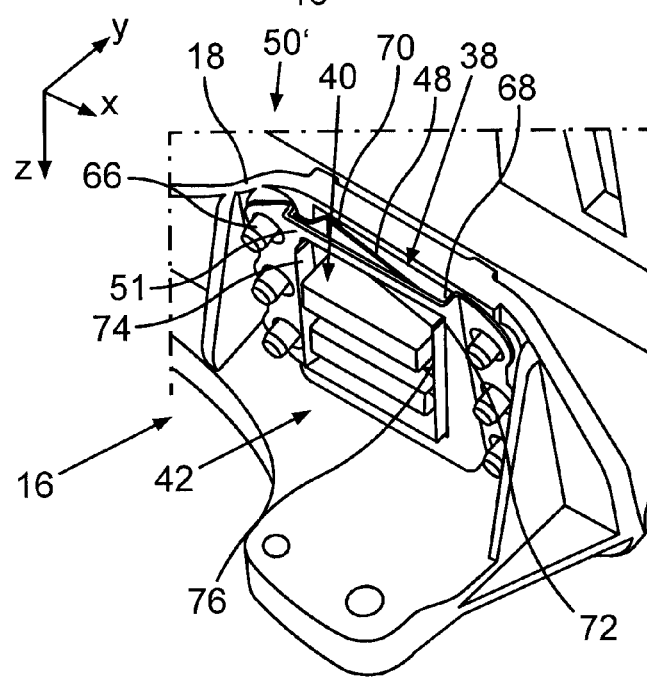
Figure 5:
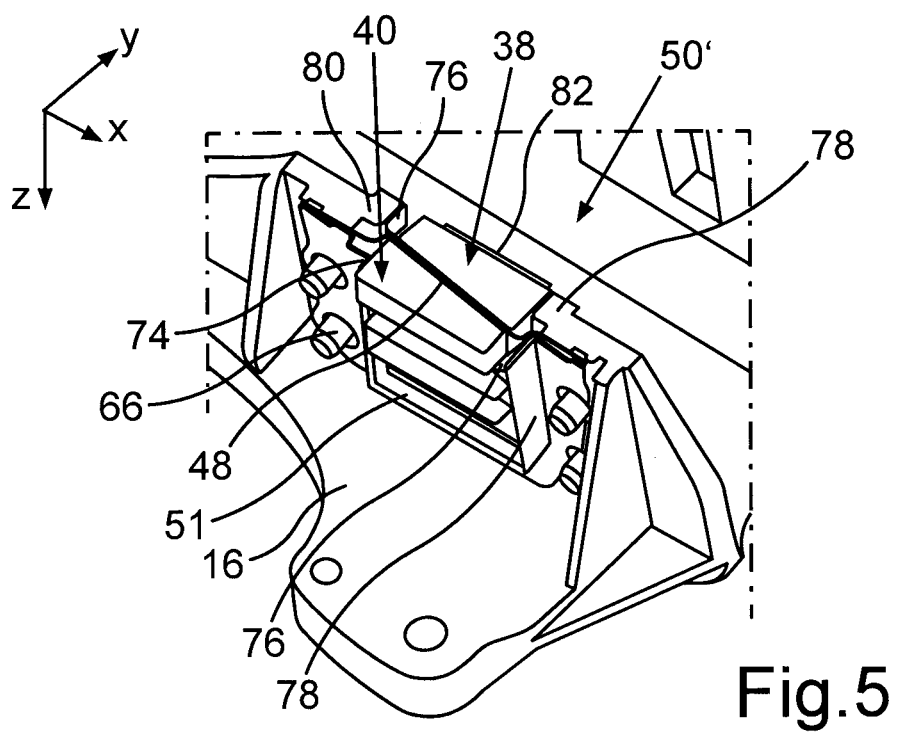

FIG. 4 is an alternative embodiment of the clamping arrangement of the clamping means in a cut-out perspective view, wherein the clamping arrangement in turn comprises two clamping wedges, between which a clamping part is arranged, which is formed to be supple in the transverse direction of the steering column arrangement, wherein the outer clamping part is fixed between a limb arrangement comprising two limbs, which is placed on bolts of the bracket of the steering column, and FIG. 5 is a cut-out perspective view of the clamping arrangement according to FIG. 4, wherein a clamping spring means is provided, by means of which the inner clamping wedge is pressed against the corresponding limb of the associated limb arrangement.

DETAILED DESCRIPTION

Figure 1:
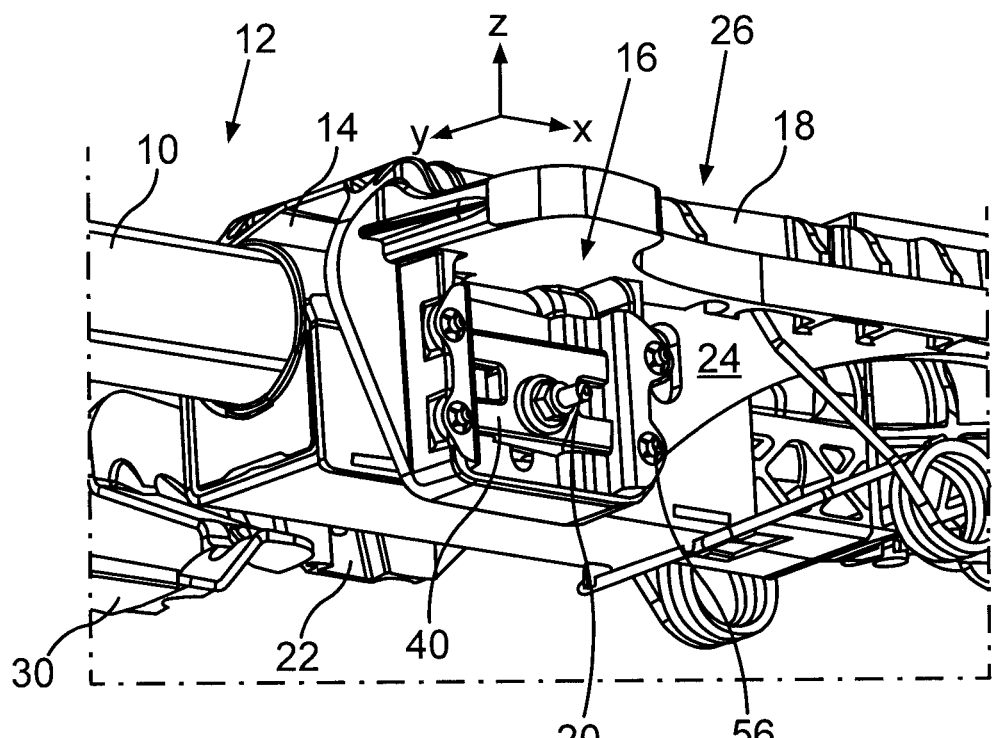

FIG. 1 shows in a cut-out perspective view from inclined below a steering column arrangement for a motor vehicle formed in the present case as a motor car. This steering column arrangement is additionally shown in FIG. 2 in a cut-out bottom view.

Figure 2:
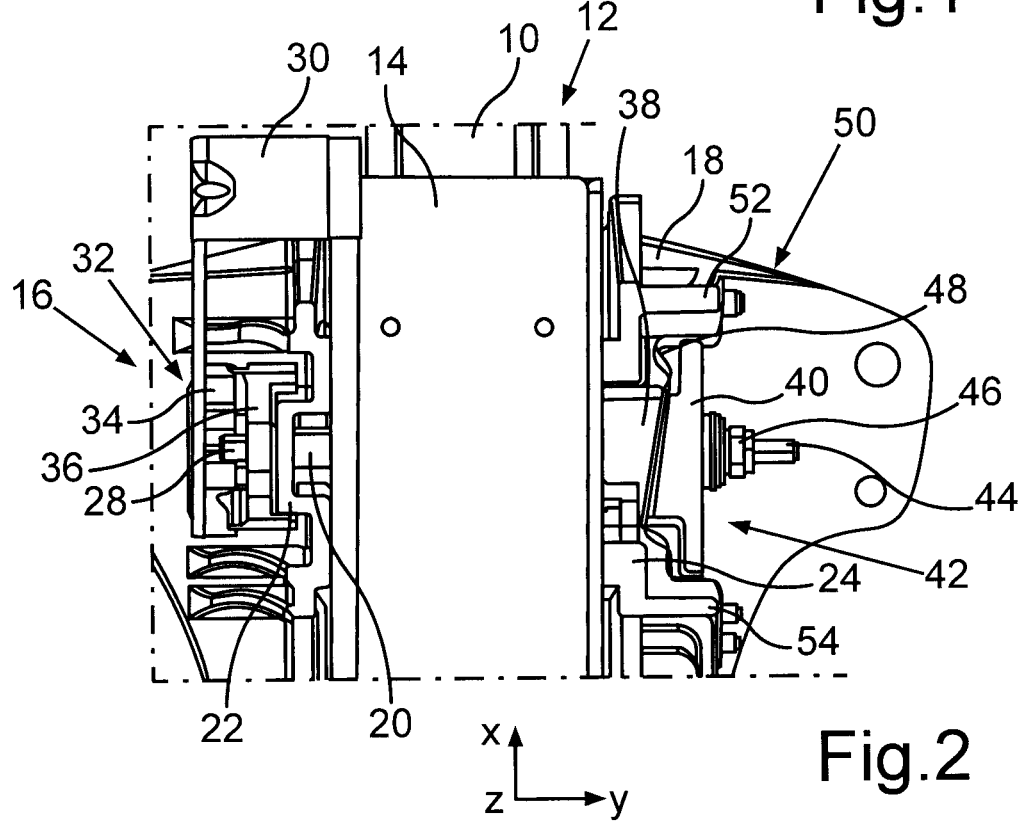
FIG. 2 is a cut-out bottom view of the steering column arrangement according to FIG. 1 in the region of the clamping means, by means of which the jacket tube supporting the steering shaft of the steering column is fixed to the bodywork-side bracket.

It can be seen from an overall view of FIGS. 1 and 2 that a jacket tube 14 supporting a steering shaft 10 of a steering column 12 is fixed by means of a clamping means 16, to be explained in further detail, to a bracket 18, which for its part is arranged in the incorporation position fixedly on the bodywork of the motor vehicle.

The clamping means 16 comprises a clamping bolt 20, which extends essentially between two bracket limbs 22, 25 running in the vehicle height direction which go downwards from a bracket region 26 extending in the vehicle transverse direction or vehicle longitudinal direction.

As can be seen in particular from FIG. 2, the clamping bolt 20 goes through the bracket limb 22 and is located with one end 28 opposite thereto and laterally outwards. In the region of this end 28 the clamping means 16 grips a handle 30 which is pivotable about the axis of the clamping bolt 20. In the clamping position shown in FIGS. 1 and 2 a tensioning means 32, which comprises in the present case two cooperating tensioning discs 34, 36 which can be twisted against each other, is correspondingly pre-tensioned. In other words the two tensioning discs 34, 36 which comprise corresponding end face tension inclinations are positioned in this position of the handle 30 relative to each other so that an axial clamping force acts on the clamping bolt 20.

This clamping force causes a force impact of two clamping wedges 38, 40 of a clamping arrangement 42 on the side facing away from the tensioning means 22. Accordingly, as particularly illustrated in FIG. 2, the bracket limb 24 is correspondingly recessed in the region of the clamping arrangement 42 so that the clamping wedge 38 lies directly on the jacket tube 14. The clamping wedge 38 can also be formed integrally with the jacket tube 14. It can also be seen that the clamping bolt 20 goes through the two clamping wedges 38, 40, whereby at the end thereof 44 a tensioning screw 46 is screwed on. The corresponding tensioning of the tension means 32 on the side laying opposite the clamping arrangement 42 causes in the closed position of the handle 30 the corresponding clamping force acting in the axial direction of the clamping bolt 20 for clamping fixing of the jacket tube 14 or the steering shaft 10 on the bracket 18.

The formation of the clamping arrangement 42 with the clamping wedges 38, 40 thereby causes, in case of an axial displacement of the jacket tube caused by an accident, an increased holding force of the clamping means 16. In other words an increased clamping force or holding force of the clamping means 16 is produced in that the clamping arrangement 42, in case of an axial forward shift of the jacket tube 14, produces an increased holding force between the vehicle-side bracket 18 and the jacket tube 14 of the steering column 12.

Figure 3:
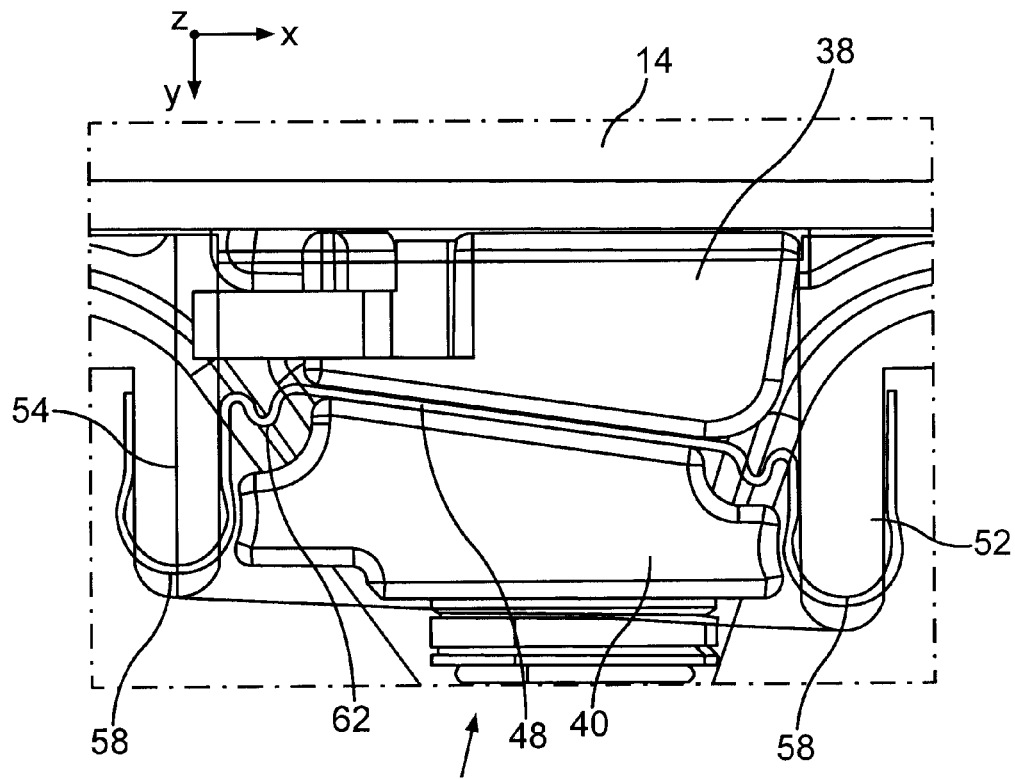
FIG. 3 is a cut-out and enlarged top view of the two clamping wedges of the clamping means, between which the clamping part formed to be supple in the transverse direction is arranged, which for its part is placed or pressed on the two limb parts of the limb arrangement of the bracket.

In a combined view with FIG. 3 which shows a cut-out and enlarged bottom view of the steering column in the region of the clamping arrangement 42 it can be seen that the clamping means 16 comprises, in the present case, a clamping part 48 in the form of a clamping plate which is arranged between the two clamping wedges 38, 40. More precisely, this clamping part 48 is held on a limb arrangement 50 of the bracket 18 which is formed by two limb parts 52, 54. These limb parts 52, 54 are positioned outwardly in relation to the corresponding bracket limb 24 approximately perpendicular—thus in the transverse direction of the steering column arrangement. According to the embodiment in FIG. 1 the clamping part 48 is fixed by means of four or more bolts 56—respectively two or more bolts for each limb part 52, 54—thereto or to the corresponding bracket limb 24. The bolts 56 are formed in the present case as pins (quick locks) cast on the limb parts 52, 54.

In the embodiment according to FIG. 3 respectively bent holders 58 are provided at the ends of the clamping part 48 which engage in a clamping manner around the respectively corresponding limb part. Fixing is thus hereby achieved which takes place not through the bolts 56 but instead by clamping or directly pressing on. Of course all other usual joining methods and mechanical fixing processes are conceivable.

It can be seen in particular in FIG. 3 that the clamping part 48 comprises two loop regions 60, 62 respectively on the outer side of a contact region 64, in which the respective clamping wedge 38 or 40 lies on the clamping part 48 formed as a clamping plate. In other words in the contact region 34 there is a planar support of the respective clamping wedge 38 or 40 on the clamping part 48.

Due to the two loop regions 60, 62 the clamping part 48 is formed to be supple in the transverse direction of the steering column arrangement—thus in the extension direction of the clamping bolt 20. This supple formation of the clamping part 48 causes a good clamping force transfer between the bracket limbs 22, 24. By means of a good transfer of the clamping force the bracket limbs 22, 24 should be designed to be as supple as possible, but this contradicts high rigidity and a high characteristic frequency of the steering column 12. This conflict of aims is solved by the present clamping part 48.

Furthermore it can be seen in particular from FIG. 3 that the clamping part 48 is formed to be rigid in shear terms or arranged on the bracket 18 in the longitudinal direction of the steering column arrangement—thus perpendicular to the clamping bolt 20. This takes place in that the clamping part 48 is adapted between the holders 58 in its length to the distance of the two limb parts 52, 54. The clamping part 48 cannot therefore move in the longitudinal direction of the steering column arrangement but is instead formed rigidly in shear terms in the longitudinal direction of the steering column arrangement. The desired high rigidity and characteristic frequency of the steering column 12 are hereby possible. The supple clamping part 48 transfers the clamping forces particularly favorably to the two clamping bodies or clamping wedges 38, 40, whereby the rigidity is increased in the longitudinal direction of the clamping part 48 in terms of shear rigidity.

All in all it can thus be seen that in the present case the contradiction can be easily solved, namely guaranteeing at the same time a high rigidity and characteristic frequency of the steering column 12 and on the other hand facilitating a good clamping force transfer. In this connection the supple clamping part 48 in the transverse direction of the steering column arrangement is used, which is arranged in such a way between the two limb parts 52, 54 that it is rigid in terms of shear in the longitudinal direction of the steering column arrangement in order to hereby achieve the desired high rigidity and characteristic frequency of the steering column.

FIG. 4 shows an alternative embodiment of the clamping arrangement 42 of the clamping means 16 in a cut-out perspective view, wherein the clamping arrangement 42 in turn comprises two clamping wedges 38, 40, between which the clamping part 48 is arranged which is formed to be supple in the transverse direction of the steering column arrangement.

Unlike the embodiment according to FIGS. 1 to 3, however, in the present case a different type of limb arrangement 50' is provided. This limb arrangement 50' is formed in the embodiment according to FIG. 4 by a plate 51 which is placed on corresponding pins 66 (quick locks) of the bracket 18. The inner clamping wedge 38 close to the jacket tube is thereby arranged between limbs 68, 70, the outer clamping wedge 40 between limbs 72, 74 of the limb arrangement 50'. A further peculiarity consists further in that the clamping wedges 38, 40 are respectively designed in two parts.

In the embodiment according to FIG. 5, which shows a substantially similar limb arrangement 50' to that in FIG. 4, the inner clamping wedge 38 close to the jacket tube is arranged between limbs 78, 80 formed on sides of the bracket 16. The outer clamping wedge 40' is arranged similarly to FIG. 4 between limbs 72, 74 of the limb arrangement 50'.

In an overall view of FIG. 4 with FIG. 5 a further peculiarity appears. Indeed in the embodiments according to FIGS. 4 and 5 a clamping spring means 76 is provided, by means of which the inner clamping wedge 38—in the vehicle longitudinal direction (x direction) towards the rear—is pressed against the corresponding rear limb 78 of the associated limb arrangement 50'. The clamping spring means 76 thereby rests on the front limb 80.

Likewise a further clamping spring means 76 is provided, by means of which the outer clamping wedge 40—in the vehicle longitudinal direction (x direction) to the front—is pressed against the corresponding front limb 74 of the associated limb arrangement 50'. The clamping spring means 76 thereby rests on the rear limb 72.

Both clamping spring means 76 are formed in the present case as leaf spring elements. Other designs are of course also conceivable. The respective leaf spring element of the corresponding clamping spring means 76 can thereby be fixed for example to the lower side of the respective clamping wedge 38, 40, for example being screwed or stuck on.

Furthermore, a friction foil 82 between the inner clamping wedge 38 and the steering column 12 is known from FIG. 5, which is formed integrally with the leaf spring element of the clamping spring means 76. By means of this friction foil 82 the leaf spring element of the clamping spring means 76 can be fixed to the inner clamping wedge 38.

Through the clamping spring means 76 all in all, in case of a force impact and backward displacement in the steering column 12 caused by an accident, a particularly rapid response of the clamping arrangement 42 in the vehicle longitudinal direction (x direction) is achieved as the clamping wedges 38, 40 are constantly in a supported position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A steering column arrangement for a motor vehicle, comprising:
    bracket; and
    a jacket tube of a steering column supporting a steering shaft is releasably fixed by a clamping mechanism to the bracket,
    wherein the clamping mechanism comprises first and second clamping wedges and at least one clamping part that is supple in a transverse direction of the steering column arrangement,
    wherein the at least one clamping part is arranged between the first and second clamping wedges in such a manner that when the clamping mechanism is engaged the first and second clamping wedges engage with the at least one clamping part.

2. The steering column arrangement according to claim 1, wherein the at least one clamping part is rigid in shear terms in a longitudinal direction of the steering column arrangement.

3. The steering column arrangement according to claim 1, wherein the bracket comprises a limb arrangement with limb parts, between which the first and second clamping wedges of the clamping mechanism are received.

4. The steering column arrangement according to claim 1, wherein a limb arrangement with limbs is fixed to the bracket, between which the first and second clamping wedges of the clamping mechanism are received.

5. The steering column arrangement according to claim 3, wherein the at least one clamping part is fixed to the limb arrangement by being placed thereon.

6. The steering column arrangement according to claim 4, wherein the at least one clamping part is fixed to the limb arrangement by being placed thereon.

7. The steering column arrangement according to claim 1, wherein the at least one clamping part comprises two loop regions that provide the suppleness in the transverse direction.

8. The steering column arrangement according to claim 3, further comprising:
    a clamping spring mechanism by which a respective one of the first and second clamping wedges is pressed against a corresponding limb of the limb arrangement.

9. A steering column arrangement for a motor vehicle, comprising:
    bracket; and
    a jacket tube of a steering column supporting a steering shaft is releasably fixed by a clamping means to the bracket,
    wherein the clamping means comprises first and second wedges and at least one clamping part that is supple in a transverse direction of the steering column arrangement,
    wherein the at least one clamping part is arranged between the first and second clamping wedges in such a manner that when the clamping mechanism is engaged the first and second clamping wedges engage with the at least one clamping part.

10. The steering column arrangement according to claim 9, wherein the at least one clamping part is rigid in shear terms in a longitudinal direction of the steering column arrangement.

11. The steering column arrangement according to claim 9, wherein the bracket comprises a limb arrangement with limb parts, between which the first and second clamping wedges of the clamping means are received.

12. The steering column arrangement according to claim 9, wherein a limb arrangement with limbs is fixed to the bracket, between which the first and second clamping wedges of the clamping means are received.

13. The steering column arrangement according to claim 11, wherein the at least one clamping part is fixed to the limb arrangement by being placed thereon.

14. The steering column arrangement according to claim 12, wherein the at least one clamping part is fixed to the limb arrangement by being placed thereon.

15. The steering column arrangement according to claim 9, wherein the at least one clamping part comprises two loop regions that provide the suppleness in the transverse direction.

16. The steering column arrangement according to claim 11, further comprising:
    a clamping spring means by which a respective one of the first and second clamping wedges is pressed against a corresponding limb of the limb arrangement.

\* \* \* \* \*